United States Patent

Friestad

[15] 3,688,578
[45] Sept. 5, 1972

[54] LIQUID LEVEL GAUGE

[72] Inventor: Roland W. Friestad, 1640 N. Kellogg St., Galesburg, Ill. 61401

[22] Filed: Aug. 13, 1970

[21] Appl. No.: 63,421

[52] U.S. Cl.....................................73/313, 73/321
[51] Int. Cl..............................................G01f 23/10
[58] Field of Search........73/321, 318, 313, 305, 409, 73/403, 308; 338/33; 317/246

[56] References Cited

UNITED STATES PATENTS

| | | | |
|---|---|---|---|
| 3,433,073 | 3/1969 | Kunert | 73/313 |
| 3,452,175 | 6/1969 | Wilkes | 200/153 |
| 2,492,727 | 12/1949 | Ballard | 338/157 X |
| 3,566,221 | 2/1971 | Sargent | 317/246 |
| 1,664,416 | 4/1928 | Hohorst | 73/321 |
| 3,569,872 | 3/1971 | Berlin | 316/242 |

OTHER PUBLICATIONS

Research Report, Dec. 1967 of Sandia Lab., Albuquerque "Rolamite.....Concept." D. F. Wilkes

*Primary Examiner*—Louis R. Prince
*Assistant Examiner*—Daniel M. Yasich
*Attorney*—Rogers, Ezell, Eilers & Robbins

[57] ABSTRACT

A liquid level gauge using floatable, rotatable members which are directly responsive to liquid level and operate with substantially only rolling friction. The rotatable, floatable members are held under tension by a roller band device which substantially eliminates or minimizes sliding friction. The liquid level may be read directly from the relative position of the rotatable, floatable members within a housing or through an electrical meter indicating device wherein the position of the rotatable, floatable members and the roller band varies the electrical resistivity or capacitance in a circuit leading to the meter so that the meter is directly responsive to the liquid level. The resistor and capacitor which may be made in two sections which are inversely variable utilize conductive paths on the band and guide walls and may be employed in other environments as desired.

5 Claims, 16 Drawing Figures

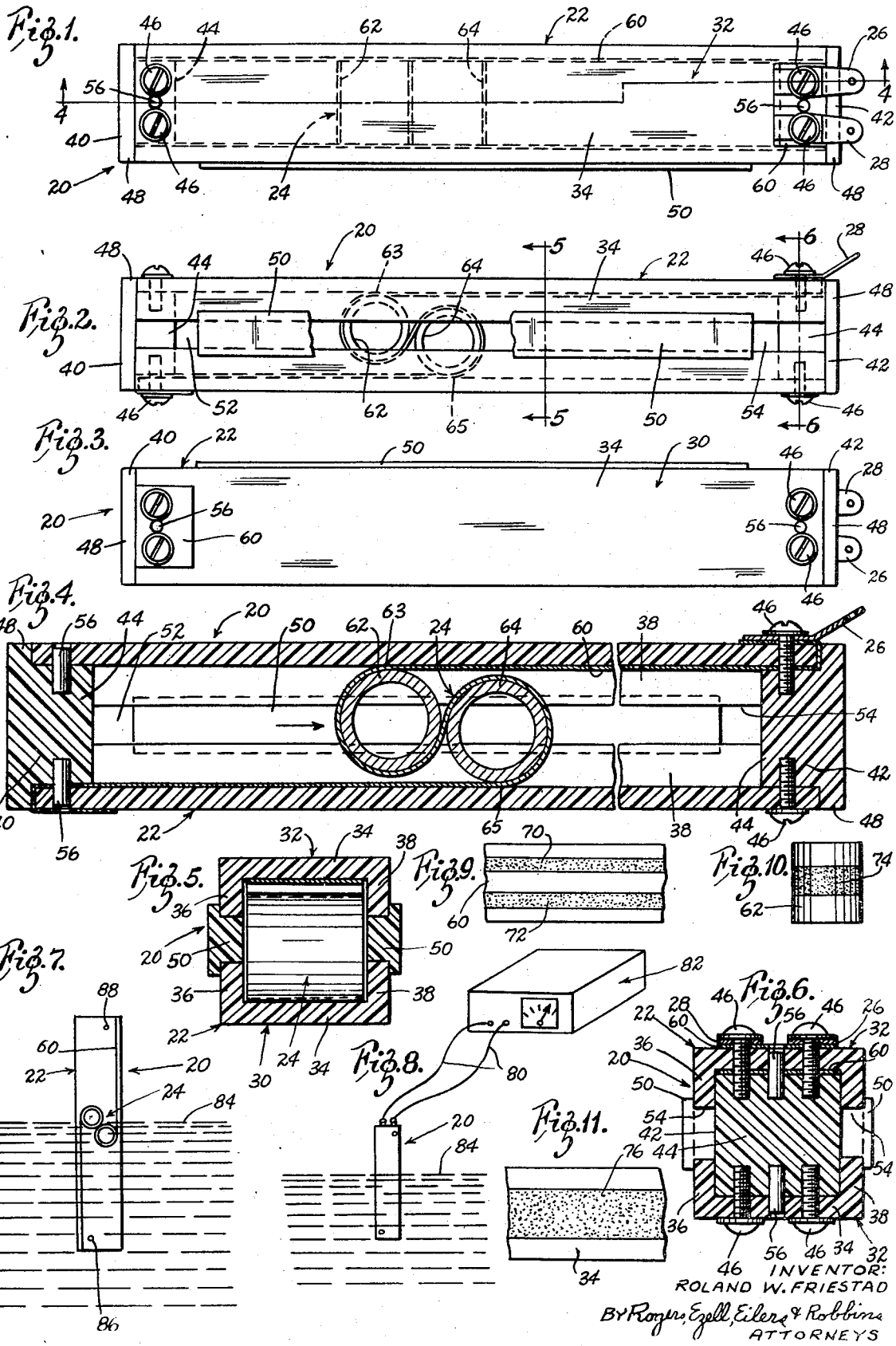

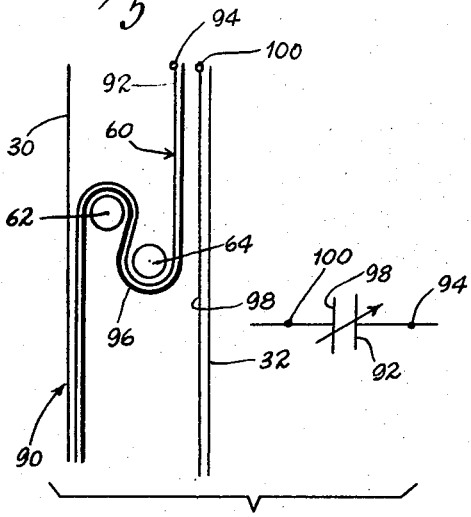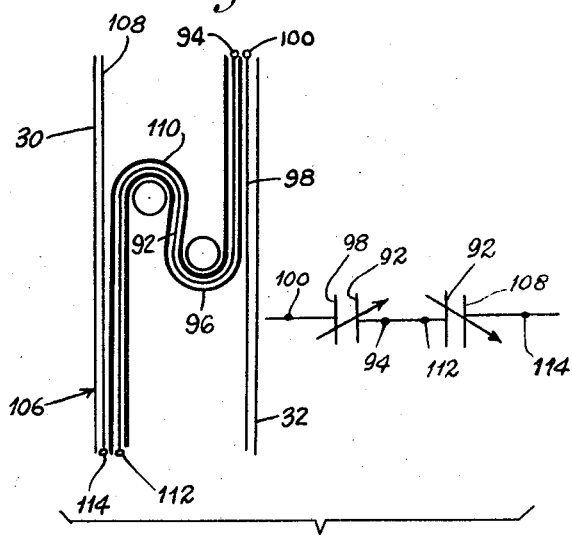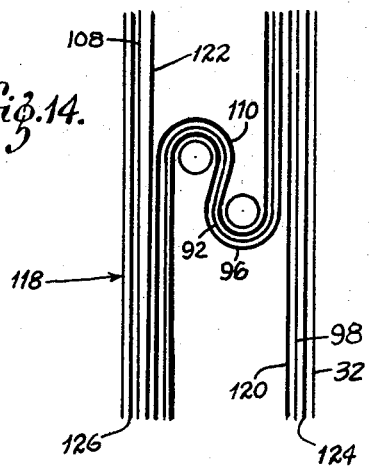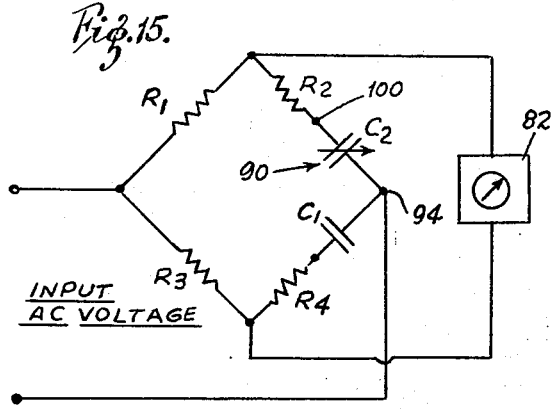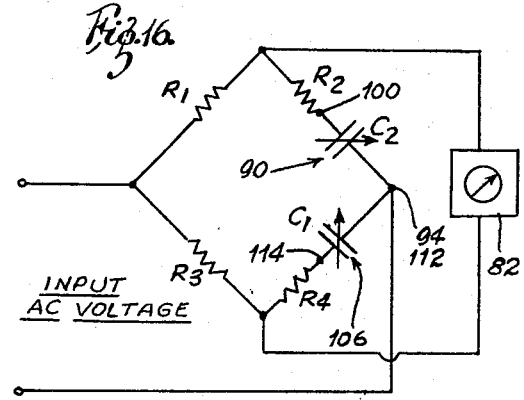

LIQUID LEVEL GAUGE

BACKGROUND OF THE INVENTION

In the past, various types of liquid level gauges have been provided using float members with means for determining the liquid level by observation of the relative position of the float or by change in an electrical circuit responsive to the position of the float. Such devices have generally employed sliding arms, pivots, and the like in which sliding friction and associated wear are encountered. Responsiveness and sensitivity of the indicating device is adversely affected by the sliding friction losses.

SUMMARY OF THE INVENTION

The instant invention employs a liquid level gauge using a roller band device of the type generally set forth in U.S. Pat. No. 3,452,175. The roller band device is housed within a housing inserted in the body of liquid to be measured and, by utilization of the roller band, a high degree of sensitivity, responsiveness and selectivity are obtained in which substantially only rolling friction is encountered in the responsive movement of the floatable, rotatable members of the roller band device with the substantial elimination of sliding friction. The liquid level to be measured can be observed through direct visual reading of the floatable, rotatable members in their relative position within the housing responsive to changes in the liquid level. A preferred means is the provision of an electrical circuit in which the resistivity or capacitance is varied by the relative position of the rotatable, floatable members within the housing and the concomitant change in the configuration of the flexible band held under tension and wound around the rotatable members. Observation of the variation in the electrical resistivity or capacitance in the circuit can be effected by connection to an electrical meter calibrated to read the liquid level responsive to the position of the rotatable members in the housing.

The gauge can be conveniently made to sense the liquid level by changes in electrical resistivity by connecting two leads of the electrical meter to the housing which is provided with two separate longitudinally extending electrical resistance paths which are adapted to be varied by the relative position of the floatable, rotatable members of the roller band device. This can be accomplished by providing an electrically conductive coating on the rotatable members which contacts in bridging relation the electrical paths at varying positions of the housing depending upon the liquid level so as to change the electrical resistance in the circuit. This may also be effected in another embodiment by providing one of the restraining surfaces or walls for the rollers with an electrically conductive coating which contacts separate electrical paths on the flexible restraining band of the roller band device to vary the electrical resistivity thereof dependent upon the relative position of the rotatable members in the housing. Other means will be apparent for providing relative changes in the electrical resistivity of the gauge responsive to the position of the rotatable members for changing the resistivity of the circuit to an electric meter for electrically sensing the liquid level.

In addition to using changes in electrical resistivity in the liquid level gauge, as noted immediately above, changes in electrical capacitance may also be employed. In the variable capacitance concept, the roller band is provided with an electrically conductive layer and insulating layer between the aforementioned conductive layer and another conductive layer on one of the restraining or guide walls of the housing with the conductive layers forming the plates of a capacitor. In this structure capacitance is added or reduced depending upon the effective area of the conductive layers as determined by the roller position. By connection through a bridge circuit the roller position through changes in capacitance is readily determined. A conventional bridge circuit can be employed in which the variable capacitance varies on AC voltage in the electric meter.

Where desired for greater sensitivity, an inversely variable capacitor system constituting two capacitor sections is effected by providing both of the opposed guide or restraining walls with an electrically conductive layer. In this fashion one of the capacitance sections is formed by the conductive layer on the roller band and one of the guide walls while the other section is formed by the remaining portion of the electrically conductive layer on the band in contact with the opposite guide wall. Depending upon the roller position, the capacitance is increased or decreased in one of the sections while in the opposed section the reverse change occurs.

The individual resistor can be employed as a resistor component in various circuits where desired and is not limited in utility to the liquid level gauge. Likewise, the variable capacitor and the inversely variable capacitor sections can be employed as electrical components in other environments beyond that of the liquid level gauge. Additionally, a capacitor can be used in hostile environment such as corrosive liquids by providing an insulating layer on both sides of the electrically conductive layer in the band and similarly coating the electrically conductive layer on the guide wall with an insulating layer and where the inversely variable capacitor is employed, so coating with an insulating layer both of the conductive layers on the opposed guide walls.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of illustration only and that the invention is not limited thereto.

In the drawings:

FIG. 1 is a top plan view of the liquid level gauge with the flexible band and rotatable members shown in dotted lines;

FIG. 2 is a view in front elevation of the liquid level gauge partly broken away to show the flexible band and the rotatable members;

FIG. 3 is a bottom plan view of the liquid level gauge;

FIG. 4 is an enlarged view in section taken on the line 4—4 of FIG. 1;

FIG. 5 is an enlarged view in section taken on the line 5—5 of FIG. 2;

FIG. 6 is an enlarged view in section taken on the line 6—6 of FIG. 2;

FIG. 7 is a view in elevation showing the positioning of the liquid level gauge in a body of liquid;

FIG. 8 is a schematic view showing the electrical connection of the liquid level gauge to an electrical indicating means in the form of an electric meter;

FIG. 9 is a fragmentary plan of a form of roller band provided with a pair of longitudinally extending electrical resistance paths;

FIG. 10 is a plan view of a roller member provided with an electrically conductive coating;

FIG. 11 is a fragmentary plan view of the base wall provided with an electrically conductive coating;

FIG. 12 is a schematic view showing the variable capacitor;

FIG. 13 is a schematic view showing the inversely variable capacitor;

FIG. 14 is a schematic view showing the inversely variable capacitor coated with an insulating layer for use in hostile or corrosive environments;

FIG. 15 is a schematic view showing the employment of the variable capacitor in a bridge circuit for use with an electric meter;

FIG. 16 is a schematic view showing the inversely variable capacitor in two sections for use with an electric meter in a bridge circuit.

DESCRIPTION OF THE INVENTION

Referring now to the drawings, the liquid level gauge of this invention is generally indicated by the reference numeral 20 as shown in FIGS. 1 through 6. It is comprised of a housing 22 and a roller band device generally indicated by the reference numeral 24. A pair of electric terminals indicated by reference number 26 and 28 are provided for connection to an electric meter in which the electrical resistivity is varied depending upon the relative position of the roller band device as will be more fully described here and below.

The housing 22 is comprised of a bottom channel member 30 and a top channel member 32 as best shown in FIG. 5. These channel members are similar in construction and have a base wall 34 bounded by opposite guidewalls 36 and 38. The base wall 34 for both the upper and lower channel members acts as a restraining surface for the rotatable, floatable members which bear against these walls. The ends of the upper and lower channel members 30 and 32 are connected to end members 40 and 42 which are identical in construction. Each end member contains a plug section 44 which nests within the upper and lower channel members. Drilled openings are provided in order that retaining screws 46 may connect the base walls 34 of the channel members to the plug section. A flange member 48 extends over the ends of the channel members to provide a flush relationship. T-shaped cover strips 50 are cemented to the sidewalls of the upper and lower channel members as best shown in FIGS. 4 and 5. They are separated from the end members to provide openings 52 and 54 for access to the liquid to be measured and also to provide for a relief opening as will be more fully described. A connecting pin 56 further connects the channel members to the end member in addition to the screws 46 which have a further purpose of connecting or anchoring the opposite ends of the roller band to the housing under tension as will be set forth below.

The roller band device 24 is best shown in FIG. 4. As there shown, it is comprised of a flexible tension band 60 which is looped around a pair of floatable, rotatable members 62 and 64 in S-fashion. One end of the roller band is connected to the upper channel member 32 by bending it over the end of the channel member and connecting the screw 46 through the end of the flexible band and into the channel member and the plug section of the end member. The opposite end of the flexible band is connected to the lower channel member 30 by the retaining screws 46 in a like fashion.

The circuit for varying the electrical resistivity within the liquid level gauge responsive to the relative position of the floatable, rotatable members 62 and 64 is best shown in FIGS. 9, 10 and 11. As shown in FIG. 9, the flexible roller band 60 is made of a flexible plastic electrical insulating material such as Dupont Mylar. The band 60 is provided with two coated electrical resistance circuits 70 and 72 which are electrically connected to the terminals 26 and 28. The electrically conductive coating can be accomplished in any one of conventional manners such as by vacuum deposition of electrically conductive metals such as nichrome electrical resistance alloys and others as well-known in the art. In addition, conductive inks and paints may be employed as will be readily understood.

The means for bridging the two separate electrical paths 70 and 72 is shown in the different embodiments of FIGS. 10 and 11. In FIG. 10, the roller 62 is shown provided with an electrically conductive coating 74 which extends longitudinally along the cylindrical outer surface of the roller so as to bridge the two circuits 70 and 72. The roller 64 may, likewise, be coated or both rollers may be coated as desired.

FIG. 11 shows a different embodiment which may be used in the absence of coating either of the rollers 62 and 64. In FIG. 11 the bottom restraining wall 34 of the lower channel member is shown provided with an electrically conductive coating 76 which is of a width sufficient to bridge the electrically conductive paths 70 and 72 in the band 60 as it is contacted against wall 34.

The variable capacitor in its basic form in designated by the reference numeral 90 in FIG. 12. It is comprised of the same structure as the roller band device 24 previously described and similar reference numerals will be employed for the same components. Thus in this device a flexible band 60 is employed around rotatable members 62 and 64 restrained by guide channel members 30 and 32. The roller band 60 is further provided with a conductive layer 92 which is connected at one end to an electric terminal 94. The band is further provided with an insulating layer 96 on an opposed side to the conductive layer so as to provide insulation against a conductive layer 98 provided on the guide wall 32. Thus the capacitor is formed by the two conductive layers 92 and 98 separated by the insulating layer 96 and the effective area of the plates of the capacitor are varied by the relative position of the roller elements 62 and 64. A terminal 100 on the conductive 98 provides with the terminal 94 means for connecting the capacitor in an electrical circuit.

An inversely variable capacitor 106 is shown in FIG. 13 which is similar to that shown in FIG. 12 where similar parts will bear the same reference numerals. However, in the inversely variable capacitor in FIG. 13 both of the guide walls are provided with conductive layers. Thus, in FIG. 13 the guide wall 30 is additionally provided with the conductive layer 108. In order to provide insulation for the capacitor formed with the guide wall 30, an additional insulating layer 110 is provided. For appropriate connection, a terminal 112 is provided at the bottom end of the conductive layer on the band and the conductive layer 108 on guide wall 30 is provided with a terminal 114. It will be apparent that as the rollers 62 and 64 are lowered from the position shown in FIG. 13, the capacitance of the capacitor formed with the guide wall 32 by the terminals 94 and 100 is increased while the capacitance is decreased for that of the other section of the capacitor formed by terminals 114 and 112 with the guide wall 30. Raising or elevation of the rollers 62 and 64 will reverse the aforementioned relationship.

FIG. 14 shows an inversely variable capacitor system similar to that of FIG. 13 in which insulation is provided for the conductive layers on the guide walls in addition to the conductive layer on the flexible band. The inversely variable capacitor of FIG. 14 is designated by the reference numeral 118 and it will be noted that an insulating layer 120 has been provided for the exterior of the conductive layer 98 on the guide wall 32 while insulating layer 122 has similarly been provided for the conductive layer 108 on the opposite guide wall 30. Where necessary for complete protection against corrosive liquids or other type of environment, an interior insulating layer 124 can be provided for the wall 32 and a similar interior insulating layer 126 can be provided for the guide wall 30. By the proper choice of insulating materials the capacitor can be used in hostile environments such as acid, alkalies, or other corrosive environment. It will be apparent that the insulating layers can similarly be employed for the capacitor of FIG. 12.

OPERATION

The liquid level gauge of this invention is shown in use in FIG. 7 and 8 connected by electrical leads 80 to an electric meter 82. For best utilization, the housing 20 is shown vertically situated in a body of liquid. In this position the rotatable members 62 and 64 float on the liquid level 84 in a position shown in the FIG. 7. Liquid is admitted into the housing through a port 86. Venting is obtained through a port 88 of the top of the housing. It will be understood that different types of openings may be employed such as those shown at 52 and 54 disclosed in FIG. 4 to control the time response of the device to short term level changes. The size of the orifices will determine the response for any given fluid. The orifices and openings can also be located along the guide surfaces and be covered or uncovered by the roller band 60 to produce a flow restriction that would be variable with the roller positions or liquid level.

The operation of the roller band device is best understood by referring to FIG. 4. As shown therein, the rollers 62 and 64 which have a diameter more than half the distance between the equidistantly spaced restraining walls 34 of the upper and lower channel members 30 and 32 are caused to bear against these walls by the flexible tension band 60. Since the band 60 is looped around the roller members and fastened under tension to the opposite ends of the housing, the band tension produces a torque which urges the roller members firmly toward the base walls 34 of the channel members 30 and 32 and holds the axes parallel to each other, and the combined effect of band tension and the restraining walls being such as to urge the rollers firmly toward each other.

By way of explanation, it appears that the force (F) to effect movement of the rotatable members contributed by any one of the three rolling contact zones at contact lines 63 and 65 formed by lines of tangency with the band at the upper and lower restraining walls and between the rollers is equal to the coefficient of rolling friction ($\mu$) times the applied normal force (N) at that zone induced by the tension band and inertial forces. At any one zone;

$$F = \mu N \quad (1)$$

so for the entire geometry, the total frictional force ($F_t$)

$$F_t = \mu_1 N_1 + \mu_2 N_2 + \mu_3 N_3 \quad (2)$$

The normal force ($N$) results from the tension applied to the band and the inertial forces of the system. Since the inertial forces of the rotatable members and band and the coefficient of friction are relatively small, the tension applied to the band may be the primary variable used to control or predict ($F$).

Since the tension band 60 is shown bent around a portion of each member 62 and 64 in opposite directions, energy stored elastically in the S-shaped part of the band applies opposite resultant forces which emanate from the axes of each rotatable member, likewise the axial components of these forces $F_b$ in opposition in the direction of each band parallel to the guideway walls at each contact line or zone as defined by the following formula where force is measured at the center of one or the other where $$F_b = WEh^3/12R^2 \quad (3)$$

where
$W$ = width of band at line contact,
$E$ = modulus of elasticity of band at line contact,
$R$ = radius of rotatable member, and
$h$ = thickness of band at line contact.

If the band parameters $W$, $E$ and $h$ are equal at both zones 63 and 65 of tangency of the rollers 62 and 64 with the flexible band and the radius of the members are equal, the opposing forces ($F_b$) will be equal and the roller-band device will be in a state of equilibrium or rest in the absence of any external forces. The direction and magnitude of these forces are essentially independent of the band tension. Because one or more of the parameters of the band may be different at the line contacts 63 and 65 of the zone of tangency of the rollers with the flexible band defined as positions 1 and 2;

$$F_{b1} \neq F_{b2} \quad (4)$$

resulting in an unbalanced force ($F_r$) being applied to the rotatable members. If for instance the force $F_{b2}$ is larger than the force $F_{b1}$, the force bias ($F_r$) will be applied to the rotatable members in the direction of the arrow in FIG. 4. If the width (W) of the band is varied, the formula for the unbalanced force becomes;

$$F_r = (W_1 - W_2)Eh^3/12R^2 \quad (5)$$

The other variables, $E$, $h$ and $R$, may be varied to apply a force bias to the rotatable members.

Where the electrically conductive coating 74 is employed on the floatable, rotatable members, it will be seen that as the liquid level rises, the rollers will likewise rise and the electrically conductive resistance paths 70 and 72 will be bridged along the shorter length so as to provide for a lesser resistance than when the liquid level is lowered. Raising and lowering will thus decrease or increase the electrical resistivity and provide a change in the electrical circuit so that the electrical meter 82 reads directly responsive to the change in the liquid level.

Where the electrically coated surface 76 is employed for the restraining wall 34 instead of the coating of the roller elements, a similar change in the electrical resistance in the circuit to electrical meter 82 is provided. Thus, as the rollers are lowered upon a lowering of the liquid level 84, the contacting of the flexible band 60 with the electrically coated resistance paths 70 and 72 is bridged by the coating 76 at a lower position in the liquid housing. As the rollers 62 and 64 are elevated in the housing upon a rise in the liquid level 84, the bridging by the coating 76 will occur at a relatively higher position in the housing to bridge the two paths 70 and 72 and decrease the electrical resistance in the circuit through the electric meter.

It will be understood that the width of the paths 70 and 72 may be varied or the resistance may otherwise be changed along the length of the flexible band 60 in a selected fashion to calibrate the electrical outlet quantity responsive to the position of the floatable, rotatable numbers within the housing. In this fashion, the electrical meter can be calibrated to compensate for non-linear tanks such as cylinder, spheres, and other shapes where the liquid level does not give a true linear relationship to the volumetric capacity of the liquid body.

The capacitor 90 or 106 and the insulated capacitor 118 may similarly be employed in the liquid level gauge using the essential structure of the liquid level gauge employing the variable resistor. Thus, for example, the capacitor 90 can be employed as the variable capacitor $C_2$ in the bridge circuit shown in FIG. 15. This circuit, commonly known as a conventional Wien bridge circuit, has an input voltage connected to the bridge circuit in which the variable capacitor is connected to the terminals 94 and 100. The output AC voltage is connected to the meter 82 and is variable depending upon the value of $C_2$ and for use in a liquid level gauge the meter is simply calibrated depending upon the position of the rollers 62 and 64 which affects the capacitance of $C_2$. The output is zero when $R_1/R_3 = R_2/R_4 = C_2/C_1$.

It is apparent that if the two capacitors $C_1$ and $C_2$ are both variable, and if one is to increase while the other decreases, increased sensitivity results. By connection of the two capacitors of the inversely variable capacitor 106 of FIG. 13 into the bridge circuit as shown in FIG. 16 it is seen by the geometry that the capacitance between the band of the guide surfaces on either side of the band will be changed in inverse relationship. In the circuit shown in FIG. 16 it is evident that the output would be increased for a given change of the roller position since $C_2$ would be changed by an equal and opposite amount as $C_1$ so that the ratio of $C_2$ to $C_1$ would be greater than if only the capacitor $C_2$ is to vary as in the circuit of FIG. 15 using the simple variable capacitor 90. An additional advantage in the inversely variable capacitor system is that an external capacitor is not required. The aforementioned bridge circuit is one means of indicating the change of capacitance in a sensing circuit and this invention is not limited thereto.

The insulated capacitor 118 shown at FIG. 14 can be employed to measure liquid levels of acids, alkalies and other corrosive fluids in obvious fashion. It will further be apparent that the insulating layers may be used for the simple variable capacitor 90 of FIG. 12 by providing a protective layer over the electrically conductive layer 98 on the guide wall and by protecting the electrically conductive layer 92 of the band with another insulating layer in the same fashion as the protected and insulated capacitor 118 of FIG. 14.

The variable resistor and capacitors described in this invention have been shown as incorporated in a novel liquid level gauge as afore-described. It is understood, however, that the variable resistor and capacitors have broader utility and can be employed in other electrical circuits in other environments as will be readily understood.

Various changes and modifications may be made within this invention as will be readily apparent to those skilled in the art. Such changes and modifications are within the scope and teaching of this invention as defined by the claims appended hereto.

What is claimed is:

1. A liquid level gauge insertable in a liquid body comprising a housing having spaced apart guide walls extending above the horizontal, a float responsive to the liquid level intermediate said walls, said float comprising a plurality of floatable, rotatable members intermediate said walls and movable longitudinally thereof having a combined cross-sectional dimension greater than the spacing between said walls, and a flexible electrically conductive band looped in a generally S-shaped fashion about adjacent rotatable members, said band having a portion secured to the housing and disposed adjacent one of said walls and having another portion secured to the housing and disposed adjacent the other of said walls for rolling movement of said rotatable members and said band longitudinally along the housing with adjacent rotatable members turning in opposite directions, and said gauge having capacitor means responsive to the relative position of said float and the looped position of the flexible band to vary the capacitance in an electrical circuit connected to a liquid level indicating means, the capacitor means comprising the spaced apart guide walls having an electrically conductive layer and the band having said electrically conductive layer covered by an insulating layer and said capacitor means comprising separate capacitor connections at each end of the housing to said electrically conductive layers, and said capacitors varying inversely responsive to the position of the rotatable members and the looped position of the flexible band.

2. The liquid level gauge of claim 1 in which a first set of capacitor connections is comprised of a connection to one of the guide walls at one end of the housing and a connection to an adjacent end of the electrically conductive layer of the band and a second set of capacitor connections is comprised of a connection to the opposed guide wall at the opposite end of the housing and a connection to the opposite end of the electrically conductive layer of said band.

3. The liquid level gauge of claim 2 in which the exposed surface of said electrically conductive layer on the band and the electrically conductive layer on one of the guide walls are covered by protective insulating layers having selected chemical or environmental properties to protect said conductive layers from environmental degradation.

4. The liquid level gauge of claim 1 in which said band is provided with said insulating layer on a side between said conductive layer on the band and the conductive layer on the guide wall.

5. The liquid level gauge of claim 1 in which the electrically conductive layers on the band and both of the opposed guide walls are covered by protective insulating layers having selected chemical or environmental properties to protect said conductive layers from environmental degradation.

* * * * *